(No Model.)

E. G. WOODHAM.
MUCILAGE BOTTLE.

No. 577,474.  Patented Feb. 23, 1897.

WITNESSES
John Buckler,
C. Gerst

INVENTOR
Elizabeth G. Woodham
BY
Edgar Galet & Co
ATTORNEYS

UNITED STATES PATENT OFFICE.

ELIZABETH GRAHAM WOODHAM, OF GOBLE, OREGON.

MUCILAGE-BOTTLE.

SPECIFICATION forming part of Letters Patent No. 577,474, dated February 23, 1897.

Application filed October 7, 1896. Serial No. 608,152. (No model.)

*To all whom it may concern:*

Be it known that I, ELIZABETH GRAHAM WOODHAM, a citizen of the United States, and a resident of Goble, in the county of Columbia and State of Oregon, have invented certain new and useful Improvements in Mucilage-Bottles, of which the following is a specification, reference being had to the accompanying drawings, forming a part thereof, in which similar numerals of reference indicate corresponding parts wherever found throughout the several views.

This invention relates to mucilage-bottles; and the object thereof is to provide an improvement in this class of devices in which the mucilage-bottle is placed in a bottle or vessel of similar form which is adapted to be filled or partially filled with water, the mucilage-bottle being provided with a neck to which is secured an annular perforated attachment in which is placed an annular wick or other capillary device, which is provided with a downwardly-directed extension or extensions and by means of which the water is carried upwardly to or into the annular wick and passes through the perforated walls of the annular chamber in which the wick is placed, this construction being designed to prevent the mucilage from collecting or drying upon the inner walls of the neck of the bottle.

The invention is fully disclosed in the following specification, of which the accompanying drawings form a part, in which—

Figure 1:
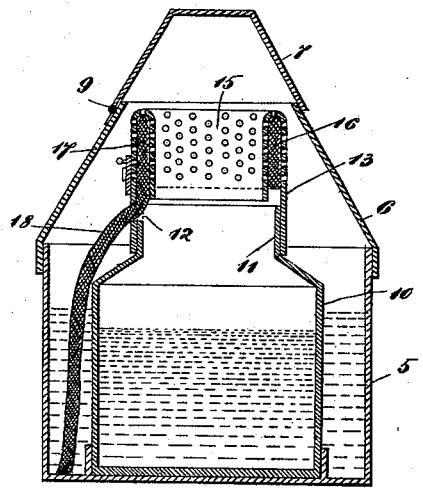
Figure 2:
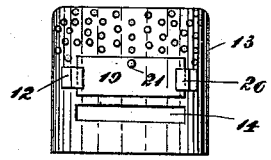

Figure 1 is a central vertical section of my improved mucilage-bottle and the vessel in which it is placed; Fig. 2, a side view of the perforated annular attachment, which is designed to be connected with the neck of the mucilage-bottle and which contains the wick; and Fig. 3, a side view of a part of the wick which I employ.

In the practice of my invention I provide a vessel 5, which is provided with a removable cover 6, which is preferably conical in form, and the apex of which is cut away and provided with a hinged cap 7, which is also conical in form and which is hinged at 9 to the conical portion 6.

The vessel or receptacle 5 is adapted to contain water, and I also provide a mucilage-bottle 10, the body portion of which is similar in form to the vessel or receptacle 5, and which in practice is placed in said vessel or receptacle, as clearly shown in Fig. 1, and, if desired, the bottle 10 may be secured in the vessel or receptacle 5, so as to provide a space 11, which entirely surrounds the body 10.

The bottle 10 is provided with a short neck 11, in one side of which is a transverse slot or opening 12, and I also provide a removable attachment 13, which is tubular in form at its lower end and adapted to be connected with the neck 11 and which is provided with a slot 14 in one side thereof, which is adapted to register with the slot 12, and the upper end of the tubular attachment is curved inwardly and downwardly, so as to form an interior circular tube 15, whereby an annular chamber 16 is formed, which is open at the lower end and closed at the upper end.

Figure 3:
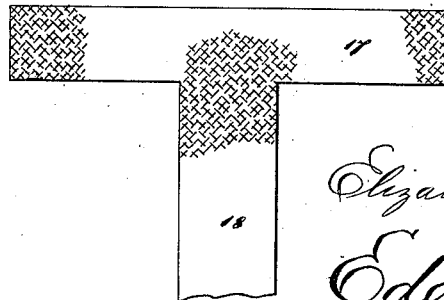

The annular chamber 16 is designed to receive a circular wick 17, which is provided with a downwardly-directed extension 18, which passes through the slots 12 and 14, and this wick in practice is first formed as shown in Fig. 3, and consists of the strip 17, which is adapted to be placed in the annular chamber 16, and said strip is provided at one side with the depending extension 18, hereinbefore referred to.

The interior wall 15 of the chamber 16, in which the wick is placed, is perforated throughout its extent, and said perforations are also preferably placed in the upper wall of said chamber, and in the outer wall thereof, though the perforations in the outer wall may be dispensed with, if desired, and said attachment 13 is provided on the side thereof, above the transverse slot 14, with a vertically-movable plate 19, which is held in place by keepers 20, in which said plate is free to slide, and said plate is provided with a knob or handle 21, and the object of the plate 9 is to regulate the size of the slot or opening 14 and also to apply pressure to the extension 18 of the wick 17, so as to regulate the capillary action thereof.

The vessel or receptacle 15 is filled or partially filled with water, and the water passes upwardly through the extension 18 of the wick 17 into said wick, and is gradually and regularly fed out through the perforations 15 in the inner wall of the annular chamber 16, so as to keep said inner wall moist at all times, and the result of which operation is to prevent the mucilage from collecting and drying on the neck of the bottle or on the inner wall of the attachment 13. It will be understood that in removing the brush from the mucilage-bottle in the usual manner the mucilage thereon comes in contact with the inner wall 15 of the chamber 16, and by reason of the fact that the inner surface of this wall is continually moist or wet said mucilage will flow back into the bottle, as will be readily understood, and will not collect on or dry upon the attachment 13 or the neck of the bottle.

It will be apparent that the cover 6 of the vessel or receptacle 5 may be of different form, as may also the hinged cap 7 of said cover, and it will also be apparent that other changes in and modifications of the construction herein described may be made without departing from the spirit of my invention or sacrificing its advantages, and I reserve the right to make all such alterations therein as fairly come within the scope of the invention.

The placing of the mucilage-bottle within a vessel or receptacle filled with water also prevents to an extent the evaporation of the mucilage and keeps the same in good condition at all times, while the amount of water which would pass through the perforations in the inner wall of the chamber 16 and downwardly into the mucilage will not be sufficient to interfere with the efficacy thereof.

Having fully described my invention, I claim as new and desire to secure by Letters Patent—

1. The combination with a vessel or receptacle, which is adapted to be filled or partially filled with water, of a mucilage-bottle which is placed therein, said mucilage-bottle being provided with a neck attachment having an annular chamber the inner wall of which is perforated, and said chamber being adapted to receive a wick which is provided at one side with an extension which projects downwardly into the water receptacle or vessel, substantially as shown and described.

2. The herein-described mucilage-bottle which is provided with an attachment which is tubular in form, and in the upper end of which is an annular chamber which is open at its lower side, and the inner wall of which is perforated, said attachment being provided with a transverse slot in one side, substantially as shown and described.

3. The herein-described mucilage-bottle which is provided with an attachment which is tubular in form, and in the upper end of which is an annular chamber which is open at its lower side, and the inner wall of which is perforated, said attachment being provided with a transverse slot in one side, and the neck of the bottle being provided with a corresponding slot, substantially as shown and described.

4. The herein-described mucilage-bottle which is provided with an attachment which is tubular in form, and in the upper end of which is an annular chamber which is open at its lower side, and the inner wall of which is perforated, said attachment being provided with a transverse slot in one side, and the neck of the bottle being provided with a corresponding slot, and said attachment being also provided with a vertically-movable plate, which is mounted on one side thereof, directly over the slot formed therein, substantially as shown and described.

5. The herein-described mucilage-bottle which is provided with an attachment which is tubular in form, and in the upper end of which is an annular chamber which is open at its lower side, and the inner wall of which is perforated, said attachment being provided with a transverse slot in one side, and the neck of the bottle being provided with a corresponding slot, and said attachment being also provided with a vertically-movable plate, which is mounted on one side thereof, directly over the slot formed therein, said bottle being also adapted to be placed in a water vessel or receptacle, substantially as shown and described.

6. The herein-described mucilage-bottle which is provided with an attachment which is tubular in form, and in the upper end of which is an annular chamber which is open at its lower side, and the inner wall of which is perforated, said attachment being provided with a transverse slot in one side, said annular chamber being adapted to receive a wick, which is provided at one side with an extension which projects through said slot, and a water vessel or receptacle in which the mucilage-bottle is placed, substantially as shown and described.

In testimony that I claim the foregoing as my invention I have signed my name, in presence of the subscribing witnesses, this 26th day of September, 1896.

ELIZABETH GRAHAM WOODHAM.

Witnesses:
   J. S. GILTSER,
   S. C. CATCHING.